2,902,479
Patented Sept. 1, 1959

2,902,479

CARBOXYMETHYL ALGINATE PRODUCT AND METHODS OF PREPARING CARBOXYMETHYL ALGINATE

William H. McNeely and John J. O'Connell, San Diego, Calif., assignors to Kelco Company, San Diego, Calif., a corporation of Delaware No Drawing. Application March 1, 1957
Serial No. 643,245

11 Claims. (Cl. 260—209.6)

This invention relates to a new compound, carboxymethyl alginate, and methods of preparing said compound.

In accordance with this invention we have surprisingly found that we could react a carboxymethyl group with a hydroxy group in an algin chain to produce carboxymethyl alginate ethers.

Our new algin compounds have a greater neutralizing value than conventional algin compounds and, accordingly, have many uses as buffering agents. They should find utility as an ingredient in formulations used as so-called anti-acids for stomach disorders.

This invention has as an object the preparation of a new and useful product, i.e., carboxymethyl alginate. A further object is the production of a new and useful algin. A still further object is the production of a new and useful buffering agent. It is another object to provide useful methods for the manufacture of carboxymethyl alginate.

In carrying out the method of our invention, we prefer to use either sodium alginate or calcium alginate as starting materials for the production of carboxymethyl alginate. However, other algins such as potassium alginate and alginic acid may be used.

In general, our method involves suspending the algin in 50% sodium hydroxide solution. The suspension of the algin in sodium hydroxide causes the algin to swell and forms the alcoholate which is required for the reaction with the chloroacetate as hereinafter described. In addition to using sodium hydroxide for this purpose, we may also use potassium hydroxide. The sodium or potassium hydroxide is added as a concentrated solution having 60% or less of water. We prefer to use from about 0.3 part to 0.6 part of hydroxide per part of the alginate dry basis.

During the aforesaid hydroxide treatment, it is sometimes necessary to add material such as alcohol to prevent undue thickening of the algin during the swelling process. In using calcium alginate as a starting material, the hydroxide treatment does not cause the said alginate to go completely over to a material of a heavy pastelike consistency. However, to maintain a similar consistency with a sodium alginate, a small amount of a lower aliphatic alcohol such as a methyl, ethyl, and isopropyl alcohol may be incorporated.

Following the treatment with the hydroxide, the algin so treated is then contacted with a chloroacetic compound selected from the group consisting of chloroacetic acid and water soluble salts thereof. We prefer to use a sodium chloroacetate solution. The chloroacetic compound, calculated as sodium chloroacetate, is used in an amount that is varied depending upon the degree of substitution desired, as well as the temperature and time of reaction. In general, we prefer to use from about .4 to 1.5 parts by weight as sodium chloroacetate per part of algin calculated as sodium alginate, dry basis.

The reaction time for the aforementioned materials will vary depending on the temperature at which the reaction is carried out. A temperature and reaction time is selected to obtain optimum reaction of the ingredients with a minimum degradation effect on the algin. Ordinarily, this is in the range of 0° C. to 60° C. and from 1 hour to 1 week. During the course of our experiments we found that in the 50° C. to 60° C. range, good results were obtained from 2 to 4 hours.

In the following, certain specific examples are set forth, as well as certain additional descriptive matter. These examples disclose certain embodiments of our invention as well as details for carrying out our said invention. It will be apparent from the foregoing, as well as the examples to follow, how we accomplish one or more of the objects of our invention.

*Example 1*

600 gms. of dry calcium alginate were mixed with 480 gms. of a 50% sodium hydroxide solution in a Hobart mixer. The internal temperature was maintained at 20° C. The mixing was continued for 15 minutes and then 1755 gms. of 40% sodium chloroacetate were added to the mixture. The temperature was still maintained at 20° C. The resulting mixture was allowed to set for 24 hours. It was then dumped into 4 liters of 75–25 methanol-water mix. The mix was then stirred in a large Waring Blendor for several minutes. It was then filtered and the precipitate retreated two more times by the same procedure with the methanol-water mix. A similar treatment with three 100% methanol treatments followed. The mixture was then air-dried and milled through 40 mesh. The resulting product was identified as sodium calcium carboxymethyl alginate.

*Example 2*

A 600 gm. sample of a commercial sodium alginate sold under the name Kelcosol was substituted for the calcium alginate in the preceding example and a small amount (100 to 150 ml.) of isopropyl alcohol was added in order to prevent too heavy a paste from being formed. The procedure of Example 1 was then repeated with the aforesaid exceptions, and a sodium carboxymethyl alginate was formed.

The reaction of the algin with the sodium chloroacetate may be expressed as follows:

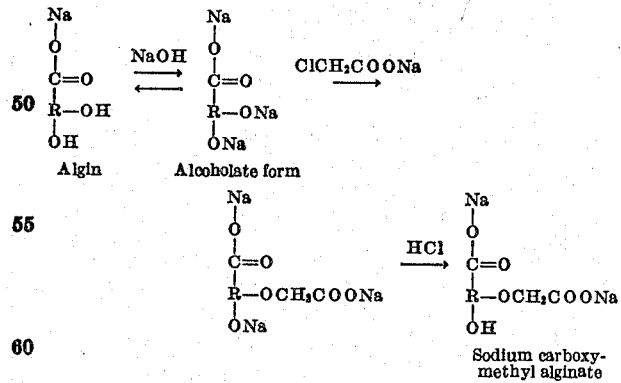

where R represents all portions of each algin polymer link to which are attached the $C_2$ and $C_3$ hydroxyls and the uronic carboxyls.

In order to analyze for the degree of substitution or carboxymethylation of the algin hydroxyl groups, a 10 gm. milled sample of the carboxymethyl alginate produced as above was added to a mixture of 160 ml. of isopropyl alcohol, 30 ml. of water, and 10 ml. of conc. HCl. The slurry so produced was stirred for ½ hour and then filtered on a Büchner funnel, using Whatman No. 41 filter paper. The solid residue was suspended in 200 ml. of a fresh alcohol-water acid mixture produced as aforesaid for ½ hour and then filtered. This was followed by two washes with 100% ethanol, and each wash was mixed for ½ hour. The sample was then air-dried at room temperature. The procedure was also run on a control sample. The control sample was prepared by repeating the carboxymethyl alginate method exactly, but substituting 1 mole of NaCl for each mole of sodium chloroacetate. This provided a material which had no carboxymethyl substitution but had undergone all other reaction conditions.

A 1.00 gm. aliquot of the acid washed material was dispersed in 200 ml. of water and titrated to a pH of 7.5 with N/10 NaOH.

A three hour oven solids at a temperature of 105° was also run on an aliquot.

The equivalent weight was obtained by dividing the equivalent of the NaOH used into the anhydrous sample weight. The degree of substitution (DS) was obtained by substituting in the formula $$DS = \frac{176}{Z}\left[\frac{Z-T}{T-58}\right]$$

where T is the equivalent weight of the sample and Z is the equivalent weight of a sample from a control run.

The DS figure indicates the number of carboxymethyl groups (on the average) attached to every $C_6$ saccharide unit.

The carboxymethylation of algin by our method has been accomplished to the extent that the number of carboxyl groups per $C_6$ unit was increased about 50% over the natural uronic carboxyl content of the algin. hTe following table shows varying amounts of substitution (DS) for algin at various temperatures.

| Sample No. | Temp., °C. | Time | DS, percent | 5% Viscosity, cps. |
|---|---|---|---|---|
| A | 50 | ½ hr | 25 | 312 |
| B | 50 | 1½ hrs | 37 | 39 |
| C | 50 | 4 hrs | 42 | 30 |
| D | 40 | ½ hr | 15 | 3,850 |
| E | 40 | 1½ hrs | 31 | 255 |
| F | 40 | 4 hrs | 41 | 105 |
| G | 30 | ½ hr | 2 | 100,000 |
| H | 30 | 1½ hrs | 12 | 38,500 |
| I | 30 | 4 hrs | 28 | 2,150 |
| J | 20 | 4 hrs | 18 | 16,400 |
| K | 20 | 24 hrs | 45 | 640 |
| L | 0–5 | 24 hrs | 9 | 15,000 |
| M | 0–5 | 1 week | 34 | 10,400 |

An acid washed and dried product made in accordance with our invention was found to be essentially free of cations other than hydrogen. Surprisingly, it was soluble and viscous in water and had a pH of about 2.7.

It will be apparent to those skilled in the art that our invention will readily lend itself to the production of a commercial algin product. If our method is to be practiced with commercial calcium alginate as a starting material, the said alginate may be removed from the plant acid line extruder and partially dried in a rotary drier to 50–80% solids. It may then be added to a jacketed incorporator and 50% NaOH (0.80 part per part of the dry alginate by weight) added while the incorporator is maintained at the desired temperature. As aforementioned, the temperature can be varied between rather wide limits and the time of reaction varied accordingly. The calcium alginate should be mixed with the 50% NaOH solution for about 15 to 20 minutes. Then to the mixture so formed a 40% solution of sodium chloroacetate should be added (2.9 parts per part of the dry alginate by weight). The temperature should be maintained while the said chloroacetate is added to the mixture. If the aforesaid reaction is carried out at about 35° C. or higher, it will be finished without removal from the incorporator in about 4 hours. If the temperature is held at about 20° C., about 24 hours will be required unless a very low degree of substitution is desired. In the event it is desired to carry out the reaction over a long period of time at a low temperature, the ingredients can be mixed and then dumped into barrels after all significant reaction heat has ceased to be given off and stored for 24 hours. If it is desired to carry out the reaction at 0° C., the same procedure could be used with the barrels put in cold storage for 1 week. The product should be washed with about 75% methanol in water after the reaction has been completed. The methanol should be used in an amount equal to about 5 to 6 parts per part of dry algin. The washing should be continued with mixing for about 30 minutes. The product should then be filtered and extraction should be continued by passing methanol-water through the product in order to remove the salt, sodium hydroxide, sodium chloroacetate and sodium glycolate, which are by-products from the reaction. During one of the last extractions, hydrochloric acid should be added to give a neutral pH. Thereafter, the product can be dried and milled by the methods used to complete other algin products.

The amount of calcium in the resulting carboxymethyl alginate product can be lowered by adjusting the pH to below neutral when adding the HCl and thereafter in a subsequent washing step neutralizing the said pH with sodium hydroxide. An alternative method for producing a low calcium product is to use sodium alginate as the source of algin. This can be carried out by incorporating the sodium alginate in alcohol, extruding, and then treating in the same manner as with the calcium alginate by using some alcohol in the reaction to prevent the mix from becoming too heavy.

Other methods of producing the new product of this invention will be apparent to those skilled in the art from the above disclosure.

We claim:

1. The process of producing sodium, calcium carboxymethyl alginate which comprises suspending calcium alginate in a concentrated sodium hydroxide solution having not more than 60% water, and thereafter mixing with said resulting suspension a sodium chloroacetate solution in an amount equal to .4 to 1.5 parts by weight of the said calcium alginate calculated as sodium alginate.

2. The process of producing sodium carboxymethyl alginate from a commercial sodium alginate which comprises mixing said commercial alginate with a concentrated sodium hydroxide solution and reacting the resulting alginate with a .4 to 1.5 parts by weight of sodium chloroacetate per part of said sodium alginate.

3. The process of producing a carboxymethyl alginate which comprises subjecting an algin from the group consisting of sodium alginate, calcium alginate, potassium alginate and alginic acid to a treatment with a concentrated alkali metal hydroxide solution, in the presence of a lower aliphatic alcohol and thereafter reacting the algin with a chloroacetic compound selected from the group consisting of chloroacetic acid and water soluble salts thereof.

4. The process of producing sodium carboxymethyl alginate from a commercial sodium alginate which comprises mixing said commercial alginate with a concentrated sodium hydroxide solution in the presence of a lower aliphatic alcohol and reacting the resulting alginate with a .4 to 1.5 parts by weight of sodium chloroacetate per part of said sodium alginate.

5. As a new article of manufacture, a carboxymethyl alginate salt.

6. As a new article of manufacture, sodium carboxymethyl alginate.

7. As a new article of manufacture, potassium carboxymethyl alginate.

8. As a new article of manufacture, calcium carboxymethyl alginate.

9. As a new article of manufacture, carboxymethyl alginic acid ether.

10. As a new article of manufacture, sodium, calcium carboxymethyl alginate.

11. The process of producing a carboxymethyl alginate salt which comprises subjecting an algin to treatment with a concentrated sodium hydroxide solution and thereafter reacting the resulting treated algin with a chloroacetate salt.

References Cited in the file of this patent

UNITED STATES PATENTS

| | | |
|---|---|---|
| 2,512,616 | Elbrl et al. | June 27, 1950 |
| 2,671,779 | Gaver et al. | Mar. 9, 1954 |
| 2,711,407 | Bauling et al. | June 21, 1955 |
| 2,811,516 | Novak | Oct. 29, 1957 |

OTHER REFERENCES

"Chemical Abstracts," vol. 45 (1951), p. 3177.